(12) United States Patent
Yang et al.

(10) Patent No.: US 10,225,132 B2
(45) Date of Patent: Mar. 5, 2019

(54) SERVING CHANNELIZED INTERACTIVE DATA COLLECTION REQUESTS FROM CACHE

(71) Applicant: CA, Inc., New York, NY (US)

(72) Inventors: Yang Yang, Newton, MA (US); Gerald L. Reno, Jr., Grafton, MA (US)

(73) Assignee: CA, Inc., New York, NY (US)

( * ) Notice: Subject to any disclaimer, the term of this patent is extended or adjusted under 35 U.S.C. 154(b) by 147 days.

(21) Appl. No.: 15/472,646

(22) Filed: Mar. 29, 2017

(65) Prior Publication Data

US 2018/0006871 A1  Jan. 4, 2018

Related U.S. Application Data

(63) Continuation-in-part of application No. 15/199,715, filed on Jun. 30, 2016.

(51) Int. Cl.
*H04L 12/24* (2006.01)
*H04L 29/08* (2006.01)
*G06F 15/16* (2006.01)

(52) U.S. Cl.
CPC ...... *H04L 41/0213* (2013.01); *H04L 41/0853* (2013.01); *H04L 67/2842* (2013.01); *H04L 41/0233* (2013.01); *H04L 41/0266* (2013.01)

(58) Field of Classification Search
USPC .......................................................... 709/213
See application file for complete search history.

(56) References Cited

U.S. PATENT DOCUMENTS

| 7,610,357 B1* | 10/2009 | Chandrachood .... H04L 41/0213 709/217 |
| 7,752,301 B1 | 7/2010 | Maiocco et al. |
| 8,078,706 B1 | 12/2011 | Raveendran |
| 8,417,688 B2 | 4/2013 | Abbondanzio et al. |
| 2003/0110154 A1* | 6/2003 | Ishihara .................. G06F 9/505 |
| 2005/0278692 A1 | 12/2005 | Sridhar et al. |

(Continued)

OTHER PUBLICATIONS

Rabkin, et al., "Chukwa: A System for Reliable Large-Scale Log Collection", EECS Department, University of California, Berkeley, Technical Report No. UCB/EECS-2010-25, Mar. 5, 2010, 15 pages, retrieved on Nov. 8, 2016 from https://www.usenix.org/legacy/event/lisa10/tech/full_papers/Rabkin.pdf.

(Continued)

*Primary Examiner* — Jude Jean Gilles
(74) *Attorney, Agent, or Firm* — Gilliam IP PLLC

(57) ABSTRACT

Expressions to calculate values from data collection can often involve additional data collection queries causing duplicate requests for SNMP data collection. The duplicate requests can lead to increased latency or even data loss as SNMP data collection requests are throttled in a network. To eliminate duplicate requests, data collection channels for variable SNMP data collection can be managed with a queue for duplicate requests. Channels for which a data collection request has already been submitted can be locked while the request is pending. Additional requests for the locked channel are considered duplicate requests and are queued until a value is returned for the initial request. The returned value is then supplied to each of the queued requests, and the channel is unlocked.

20 Claims, 5 Drawing Sheets

(56) References Cited

U.S. PATENT DOCUMENTS

| | | | |
|---|---|---|---|
| 2006/0168208 A1* | 7/2006 | Nagami | H04L 41/0893 709/224 |
| 2006/0242284 A1 | 10/2006 | Savage | |
| 2007/0250884 A1* | 10/2007 | Qiu | H04M 1/575 725/106 |
| 2009/0238561 A1* | 9/2009 | Huang | H04B 10/0793 398/25 |
| 2011/0078108 A1* | 3/2011 | Kumar | G06F 11/3495 707/602 |
| 2013/0346574 A1 | 12/2013 | Singaraju et al. | |
| 2015/0227381 A1* | 8/2015 | Botzer | H04L 41/0213 718/1 |

OTHER PUBLICATIONS

Rose, et al., "Bulk Table Retrieval With the SNMP", RFC Base, Network Working Group,Request for Comments: 1187, Oct. 1990, 12 pages, retrieved on Nov. 8, 2016 from http://www.rfc-base.org/txt/rfc-1187.txt.

* cited by examiner

SERVING CHANNELIZED INTERACTIVE DATA COLLECTION REQUESTS FROM CACHE

BACKGROUND

The disclosure generally relates to the field of data processing, and more particularly to network management data collection.

A management information base (MIB) for network management is a formal, hierarchical description of network objects that can be managed by a network management system that, for example, implements the Simple Network Management Protocol (SNMP). In a MIB, object identifiers (OIDs) have been assigned various entities across multiple levels and the entities have been named. These entities include managed resources, also referred to as managed objects. A managed object may be a device, a device attribute, a device component, etc. The Internet Engineering Task Force has defined the MIB specifications, MIB-1 and MIB-2. In addition to these specifications, private entities (e.g., device vendors) define MIB specification extensions with OIDs specific to their devices.

A management database (MDB), which is an implementation of a MIB, includes leaf nodes that resolve to scalar values or arrays of scalar values. A network management system or network manager can send GET requests to SNMP-enabled devices for specified OIDs input into the network management system. An OID may be an index to a device definition, a device attribute, a 2 dimensional array of managed objects, etc. SNMP-enabled devices provide responses with the values corresponding to the requested OIDs. This request-response exchange may be referred to as SNMP data collection.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to the MVFLEX expression language ("MVEL") in illustrative examples. But aspects of this disclosure can be use other expression languages for embedded queries, such as the OGNL language. In other instances, well-known instruction instances, protocols, structures and techniques have not been shown in detail in order not to obfuscate the description.

Overview

Although MIB extensions allow for access to a rich dataset about a variety of SNMP-enabled devices, utilizing the rich dataset for various management tasks can involve collection of a vast amount of data from an SNMP-enabled device. Expressions to calculate values from the data collection can often involve additional data collection queries ("embedded queries") causing duplicate requests for SNMP data collection. The duplicate requests can lead to increased latency or even data loss as SNMP data collection requests are throttled in a network. To eliminate duplicate requests, data collection channels for variable SNMP data collection can be managed with a queue for duplicate requests. Channels for which a data collection request has already been submitted can be locked while the request is pending. Additional requests for the locked channel are considered duplicate requests and are queued until a value is returned for the initial request. The returned value is then supplied to each of the queued requests, and the channel is unlocked.

Example Illustrations

Figure 1:
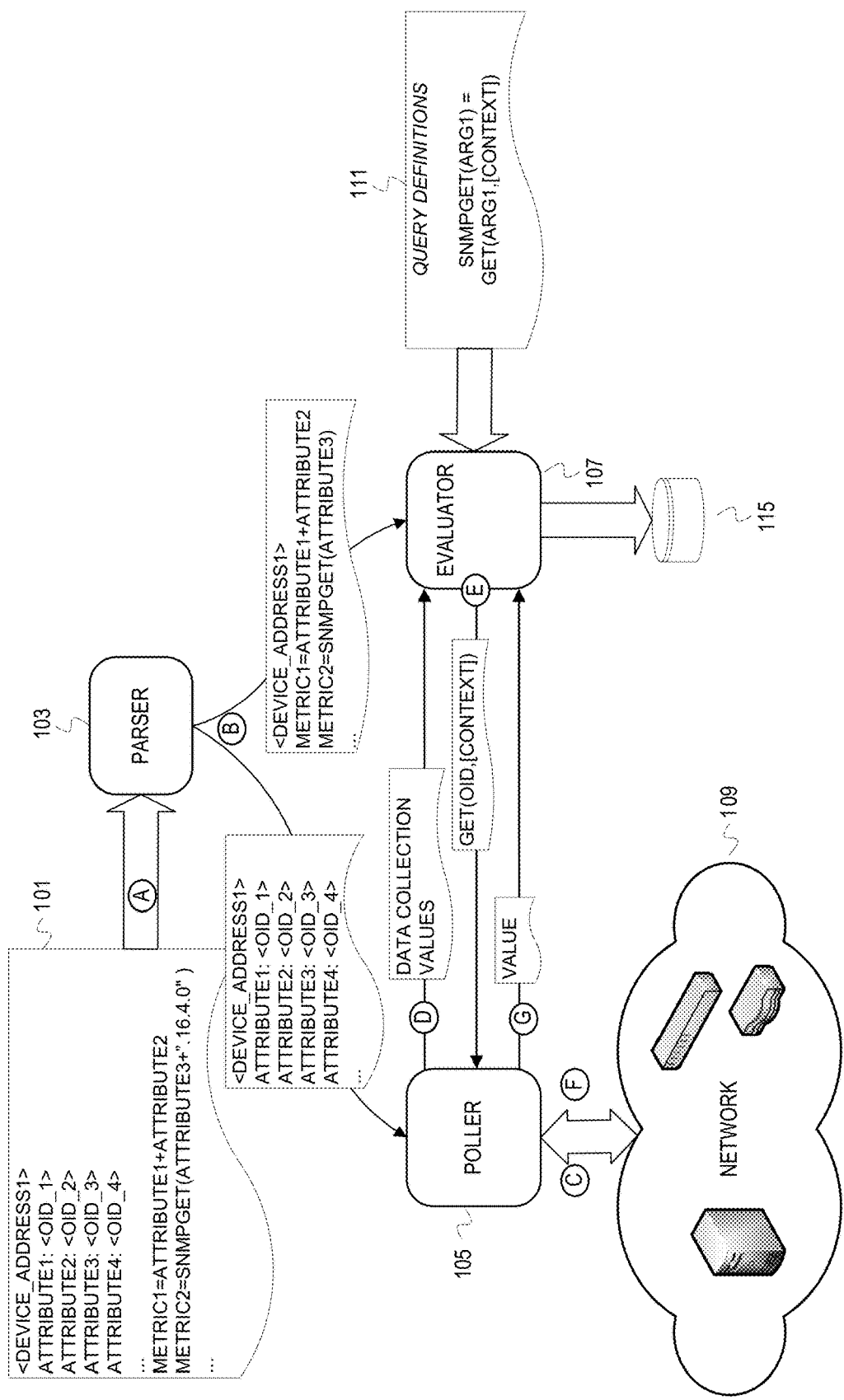
FIG. 1 depicts an example illustration of a variable SNMP data collection with an embedded query.

FIG. 1 depicts an example illustration of a variable SNMP data collection with an embedded query. Based on knowledge about attributes defined in MIBs, an SNMP data collection configuration file, sometimes referred to as a certification file, can be defined to collect attribute values. An entity can also specify expressions for computing values for various management metrics based on the collected attribute values. These expressions are referred to herein as "metric expressions." FIG. 1 depicts an SNMP data collection configuration file ("configuration file") 101. Elements of a network management system process the configuration file 101 for variable SNMP data collection, and evaluate metric expressions that use the collected attribute values. A metric expression may compute a metric value with a variable attribute value. For instance, a metric expression may compute average idle time for the busiest processors of routers in a managed network. An MIB may define an OID that identifies the busiest processor on a router. To collect the idle times for those processors, the management system will first collect the OIDs of these busiest processors, and then utilize the collected OIDs to query for idle times. In FIG. 1, depicted elements of an example network management system include a parser 103, a poller 105, and an evaluator 107. The network management system elements manage and monitor components of a network 109, which can include software components and hardware components.

FIG. 1 is annotated with a series of letters A-G. These letters represent stages of operations, each of which may be one operation or multiple operations. Although these stages are ordered for this example, the stages illustrate one example to aid in understanding this disclosure and should not be used to limit the claims. Subject matter falling within the scope of the claims can vary with respect to the order and some of the operations.

At stage A, the parser 103 parses the configuration file 101 to separate metric expressions from a list of attribute values to be collected in an SNMP data collection. This illustration depicts a configuration file with both metric expressions and an attribute list. The attribute list assigns attribute variables to OIDs. For instance, ATTRIBUTE1 is assigned to OID_1. FIG. 1 depicts the OIDs with the semantic <OID_#> instead of an actual OID which is lengthy and not easily readable (e.g., ".1.3.6.1.4.1.2021.11.53.0" is the Linux OID for raw idle cpu time). The configuration file 101 further includes metric expressions. A metric expression "METRIC2" is "SNMPGET(ATTRIBUTE3+".16.4.0")." The attribute variable "ATTRIBUTE3" is assigned to OID_3. The illustration presumes that OID_3 resolves to another OID. Therefore, the metric expression METRIC2 includes an embedded query to collect the attribute value of the OID to which OID_3 resolves. For instance, the OID_3 value may identify the interface with a greatest amount of outgoing traffic. The METRIC2 expression may modify (append appropriate branch identifiers) that OID to obtain the number of outgoing bytes for the interface identified by OID_3. The parser 103 may separate the metric expressions from the attribute list based on a dividing delimiter within the configuration 101 (e.g., a dividing character or string), header information of the configuration file (e.g., offset locations), or recognizing semantic differences between expressions and variable assignments. Although other techniques are possible, the configuration file 101 specifies a device address (e.g., Internet Protocol address) before each group of attribute values to be collected. FIG. 1 only depicts a single device address, DEVICE_ADDRESS1 in the configuration file 101. Other device addresses can be specified in the configuration file 101 or configuration files can be defined per device address. In addition, devices for data collection may be identified by a device identifier that resolves to a device profile that comprises information for establishing a session with the device (e.g., environment variables) for data collection.

At stage B, the parser 103 passes the list of attributes for data collection to the poller 105 and passes the metric expressions to the evaluator 107. The parser 103 may reformat the list of attributes for passing as input into the poller 105. The parser 103 may invoke poller program code and pass the list of attributes as arguments in the invocation. The parser 103 may pass to the poller 105 the list of attributes as a Java object, such as a JavaScript Object Notation file. Similarly, the parser 103 may pass the metric expressions to the evaluator 107 in a message, in a buffer, as a file, or by reference.

At stage C, the poller 105 performs data collection for the list of attributes from the parser 103. The poller 105 submits queries (e.g., GET commands) to the SNMP managed devices of the network 109. The poller 105 traverses the attribute list and forms the queries from each of the OIDs. When the corresponding values are returned, the poller 105 assigns the returned values to the corresponding attribute variables. For instance, the poller 105 will assign the value returned for OID_1 to the variable ATTRIBUTE1.

At stage D, the poller 105 provides the data collection values to the evaluator 107. The poller 105 may provide the data collection values to the evaluator 107 as each value is received, in batches, and/or after completion of the data collection for the attribute list.

At stage E, the evaluator 107 evaluates the metric expressions from the parser 103 and invokes embedded queries for dynamic data collection. With query definitions 111, the evaluator 107 determines a query definition for the embedded query SNMPGET(ATTRIBUTE3+".16.4.0"). According to the definition, this embedded query is implemented as GET(ARG1, [CONTEXT]), which can be a function written in the Java® programming language for example. Based on the definition, ATTRIBUTE3+".16.4.0" maps to ARG1, The semantic [CONTEXT] is used to identify a set of context parameters for the data collection implemented for the embedded query. The context parameters include static arguments, such as an SNMP version. The context parameters may also include dynamic arguments, such as a network address for a particular device. If a particular network address is to be used for the data collection, then the evaluator 107 can determine the network address for the context parameters based on information specified for a corresponding device. For instance, a device profile can be defined for each type of device and/or each device. The device profile specifies various information, such as environment variables, to establish a session with the corresponding device and collect the attribute data for the embedded query. The evaluator can determine the corresponding device with session information of the preceding data collection. The context parameters may be indicated in an object passed to the evaluator. The evaluator 107 then invokes the implementation of the embedded query with the mapped arguments. If the poller 105 manages multiple queries (e.g., multi-threaded polling across different SNMP managed devices and/or across different components), then the poller 105 can manage the invoked query.

At stage F, the poller 105 queries the managed device identified in the invoked query implementation. After collecting the attribute value of the OID in the invoked GET, the poller 105 returns the value to the evaluator 107 at stage G. With the returned value, the evaluator 107 can evaluate the metric expression METRIC2. Afterwards, the metric values can be stored in a management database 115.

Although FIG. 1 depicts a configuration file with both metric expressions and attribute values to be collected, this is not necessary. Attribute values to be collected can be specified separately from metric expressions in different files, different database entries, different datasets, etc. To bind attribute variables to the appropriate metric expressions, different techniques can be used. As examples, globally unique variables can be used; attribute variables and metric expressions can be related by network address; etc.

Figure 2:
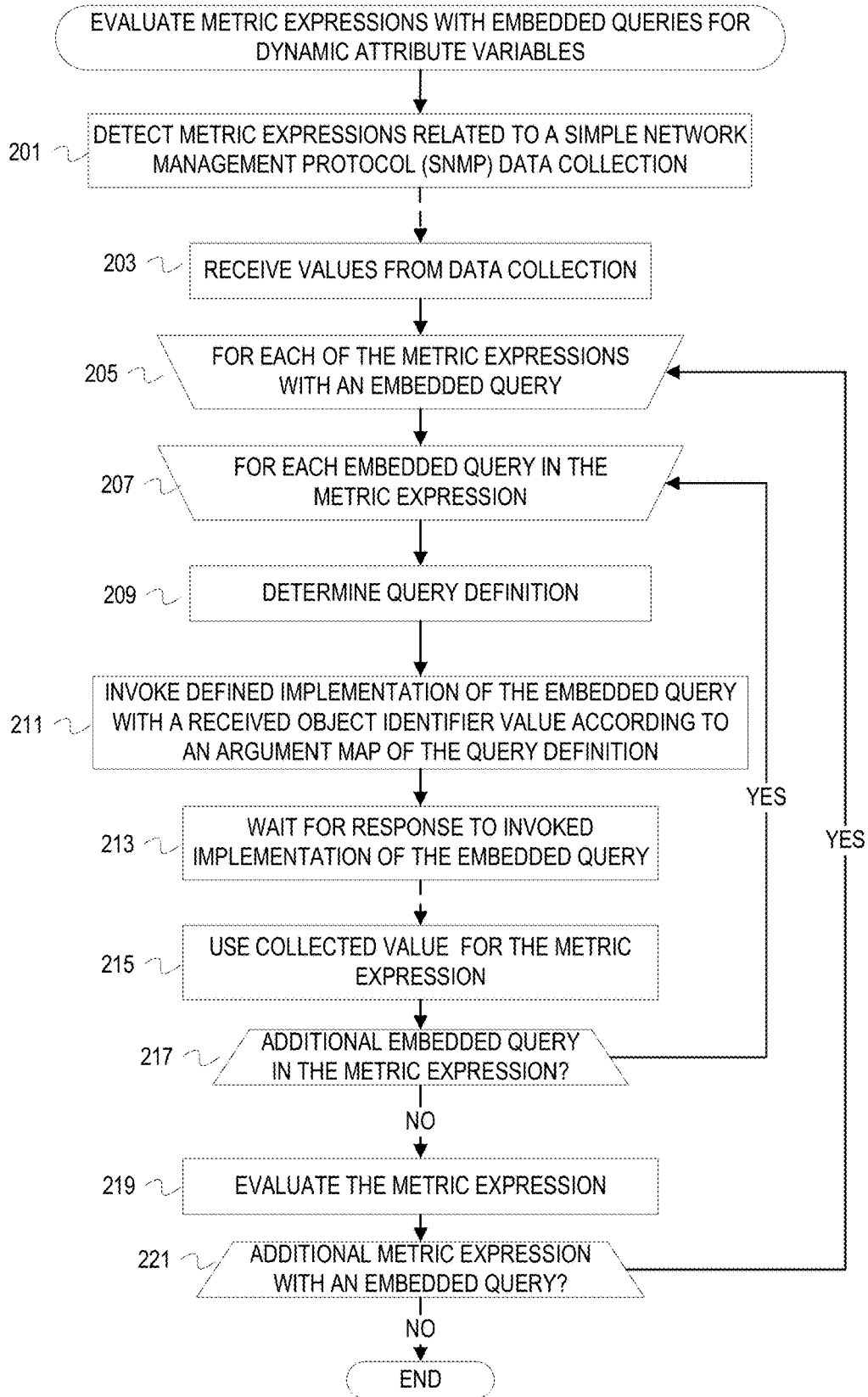
FIG. 2 is a flowchart of example operations for evaluating metric expressions with embedded queries for dynamic attribute variables.

FIG. 2 is a flowchart of example operations for evaluating metric expressions with embedded queries for dynamic attribute variables. The description of FIG. 2 refers to an evaluator as performing the example operations for consistency with FIG. 1. FIG. 2 includes dashed arrows to depict asynchronous operations that typically relate to waiting for a result or value.

An evaluator detects a set of metric expressions related to an SNMP data collection (201). As already mentioned, the metric expressions can be related by network address, configuration file identifier, etc. The evaluator may detect an object with the metric expressions. In some embodiments, the evaluator may receive the metric expressions in a message (e.g., inter-process communication message), via a buffer, as arguments in a function/method invocation, etc. Prior to or concurrently with receipt of the metric expressions, SNMP data collection of attribute values related to the metric expressions occurs. The evaluator will receive the values from the SNMP data collection and apply the received values to evaluate the metric expressions (203).

After receipt of the values, the evaluator examines the metric expressions to determine whether any have an embedded query (205). The evaluator can traverse the metric expressions as arranged when received, evaluating each in order. The evaluator can examine the metric expressions in a first pass to determine if any have embedded expressions. If some form of concurrent processing is available (e.g., multiple processing cores and/or multi-threading), the evaluator can evaluate expressions that do not have embedded queries and concurrently evaluate those with embedded queries.

For each metric expression with an embedded query, the evaluator processes each embedded query (207). To process an embedded query, the evaluator determines a query definition (209). The embedded query can be written in a dynamic expression programming language, such as the MVEL programming language. Query definitions can be written for any of the SNMP data collection commands (e.g., get, walk, bulkwalk, table, etc.) in the MVEL programming language. Additionally, in some instances, queries definitions can be written for SNMP commands that modify information on a device, such as SNMP SET. The evaluator determines an implementation of the embedded query (e.g., a Java programming language implementation of the SNMP command). The evaluator will invoke an instance of the implementation to carry out the embedded query. Before invoking, the evaluator also ascertains other arguments for the implementation to instantiate the implementation with the arguments. The query definition defines an argument map to guide injection of arguments from the embedded query into the implementation instance. The embedded query will include an attribute variable. With the data collection values, the evaluator can determine the collected OID corresponding to the attribute variable of the embedded query and use the collected OID assigned to the attribute variable in the implementation instance. In addition to any collected OID being queried, the evaluator injects context parameters into the implementation instance as mentioned above. After injecting the arguments, the evaluator invokes the implementation instance of the embedded query with the collected OID and the context parameters (211). The evaluator then waits for a response to the invoked implementation instance (213).

After receipt of a value collected for the OID indicated in the invoked implementation instance, the evaluator uses the collected value for the metric expression (215). The evaluator may load the collected value for eventual evaluation of the metric expression if there are other values to collect for the metric expression. The evaluator may replace or substitute the embedded query with the collected value. If there is an additional unresolved embedded query in the metric expression, then the evaluator proceeds to process that embedded query (217). Otherwise, the evaluator evaluates the metric expression with the collected value(s) (219).

After evaluation of the metric expression, the evaluator proceeds to examine the next metric expression if another remains (221). At any point during or after evaluation of metric expressions according to design, the evaluator can pass computed metric values to a management system for presenting via a user interface, storing, and/or further processing.

Figure 3:
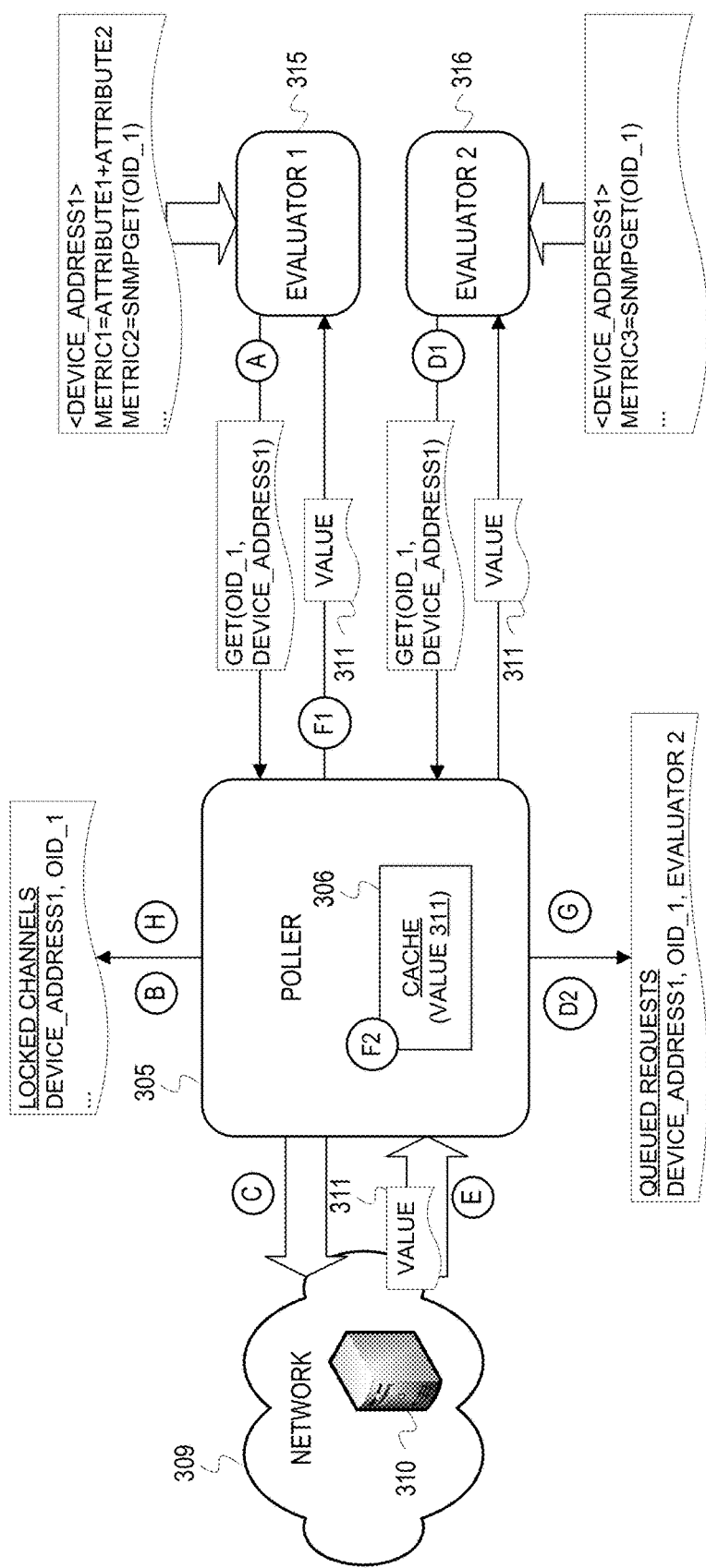
FIG. 3 depicts an example illustration of a variable SNMP data collection with queuing and a cache for embedded queries.

Example Illustrations for Managing Channelized Interactive Data Collection Requests FIG. 3 depicts an example illustration of a variable SNMP data collection with queuing and a cache for embedded queries. FIG. 3 depicts elements of an example network management system include a poller 305, an evaluator 1 315, and an evaluator 2 316. The poller 305 is communicatively coupled to a cache 306 which may be cache, memory, or other storage of a device executing the poller 305. The network management system elements manage and monitor components of a device 310 in a network 309, which can include software components and hardware components. The example network management system may also include elements not depicted, such as a parser similar to the parser 103 described in FIG. 1.

FIG. 3 is annotated with a series of letters A-H. These letters represent stages of operations, each of which may be one operation or multiple operations. Although these stages are ordered for this example, the stages illustrate one example to aid in understanding this disclosure and should not be used to limit the claims. Subject matter falling within the scope of the claims can vary with respect to the order and some of the operations.

In FIG. 3, the evaluator 1 315 and the evaluator 2 316 have received metric expressions parsed from a configuration file. The evaluator 1 315 received metric expressions for a "METRIC1" and a "METRIC2." The expression for the "METRIC2" includes an embedded query of "SMNPGET (OID_1)." The evaluator 2 316 received a metric expression for a "METRIC3" which similarly includes an embedded query for the "OID_1." Even though the evaluators are calculating different metrics, the evaluators use the same embedded queries to retrieve attribute values. For example, the "OID_1" may resolve to a table with attribute values for a plurality of processor components in the device 310, so, even if the evaluators are determining metrics for different processors, the same embedded query for the "OID_1" is used to retrieve processor attribute values from the device 310 leading to a duplicate query.

At stage A, the evaluator 1 315 evaluates the metric expressions and invokes embedded queries for dynamic data collection. The evaluator 1 315 uses received query definitions to construct a query for submission to the poller 305. The query in FIG. 3 includes an "OID_1" and a "DEVICE_ADDRESS1" although other parameters for the data collection may be included in the query. The "DEVICE_ADDRESS1" corresponds to the address for the device 310 in the network 309.

At stage B, the poller 305 determines whether a data collection query has already been submitted to a data collection channel indicated by the combination of the "DEVICE_ADDRESS1" and "OID_1." A data collection channel comprises a key-value pair of a device address and an object identifier. Multiple queries or requests to a same channel can cause polling latency or in some instances enable throttling policies of SNMP collection software leading to potential data loss as redundant queries are disposed. As a result, prior to submitting the query, the poller 305 determines whether the channel for the "DEVICE_ADDRESS1" and "OID_1" is locked. A locked channel indicates that a query for that channel has been submitted and is currently pending. The poller 305 maintains a list of channel key-value pairs for locked channels. The list may be maintained in the cache 306 or other storage such as memory. In FIG. 3, the poller 305 determines that the channel for the "DEVICE_ADDRESS1" and "OID_1" is not locked. Since a query will be submitted to the channel, the poller 305 adds the "DEVICE_ADDRESS1" and "OID_1" key-value pair to the "LOCKED CHANNELS" list to temporarily prevent additional queries to the channel.

At stage C, the poller 105 submits the query to the device 310 in the network 309 and begins waiting for a response. In some instances, the query may be pending for multiple seconds. The pending time varies based on the amount of traffic in the network 309, the number of attributes being returned, etc.

At stage D1, While the query from the evaluator 1 315 is pending, the evaluator 2 316 submits a query to the poller 305. The query is for the channel indicated by the key-value pair "DEVICE_ADDRESS1" and "OID_1." The poller 305 searches the "LOCKED CHANNELS" list to determine whether the query can be submitted to the network 309. At stage D2, the poller 305 determines that the channel "DEVICE_ADDRESS1" and "OID_1" is locked and adds the query from the evaluator 2 316 to a list of queued requests. The queued requests list includes queries that are unable to be submitted because the corresponding channel is locked. The requests are queued until a value from the channel has been returned and cached.

At stage E, the poller 305 receives a value 311 from the network 309 in response to the query submitted at stage C. The poller 105 may assign the returned value 311 to a corresponding attribute variables or otherwise process the value 311 based on parameters indicated in the query received from the evaluator 1 315.

At stage F1, the poller 305 supplies the value 311 to the evaluator 1 315 in response to the query received at stage A. Additionally, at stage F2, the poller 305 stores the value 311 in the cache 306. The poller 305 stores the value 311 in the cache 306 along with an indication of the channel "DEVICE_ADDRESS1" and "OID_1."

At stage G, the poller 305 determines whether any queued requests correspond to the value 311 in the cache 306. The poller 305 searches the "QUEUED REQUESTS" list using the channel key-value pair "DEVICE_ADDRESS1" and "OID_1." In FIG. 3, the poller 305 identifies the queued request from the evaluator 2 316. The poller 305 removes the request from the queue list and supplies the value 311 from the cache 306.

At stage H, the poller 305 unlocks the channel "DEVICE_ADDRESS1" and "OID_1." The poller 305 unlocks the channel by removing the key-value pair from the "LOCKED CHANNELS" list. Prior to unlocking the channel, the poller 305 may continue supplying the value 311 from the cache 306 in response to queries for the channel until a configured period of time has expired. For example, the poller 305 may timestamp the value 311 in the cache 306 and continue supplying the value 311 until 5 minutes have elapsed. The poller 305 then determines that the value 311 in the cache 306 is stale and unlocks the corresponding channel so fresh values may be retrieved. The default expiration time for a cached value is based on a polling interval for the corresponding device. For example, if the poller 305 polls the device 310 every two minutes, the default expiration time for cached values from the device 310 is two minutes. Additionally, the expiration time of cached values can vary based on system conditions such as the number of pending requests, traffic in the network 309, available system resources, etc.

The value 311 as described above may be a scalar value or may be a table value that can include tens or hundreds of rows that include attribute values. Evaluators, such as the evaluator 1 315 and the evaluator 2 316, can iteratively calculate indices into an SNMP table to collect multiple attribute values from the table for evaluating metric expressions. By storing and supplying values from the cache 306 as described above, the poller 305 eliminates multiple SNMP calls to the network 309 which can be generated when evaluators iteratively request values from an SNMP table.

Figure 4:
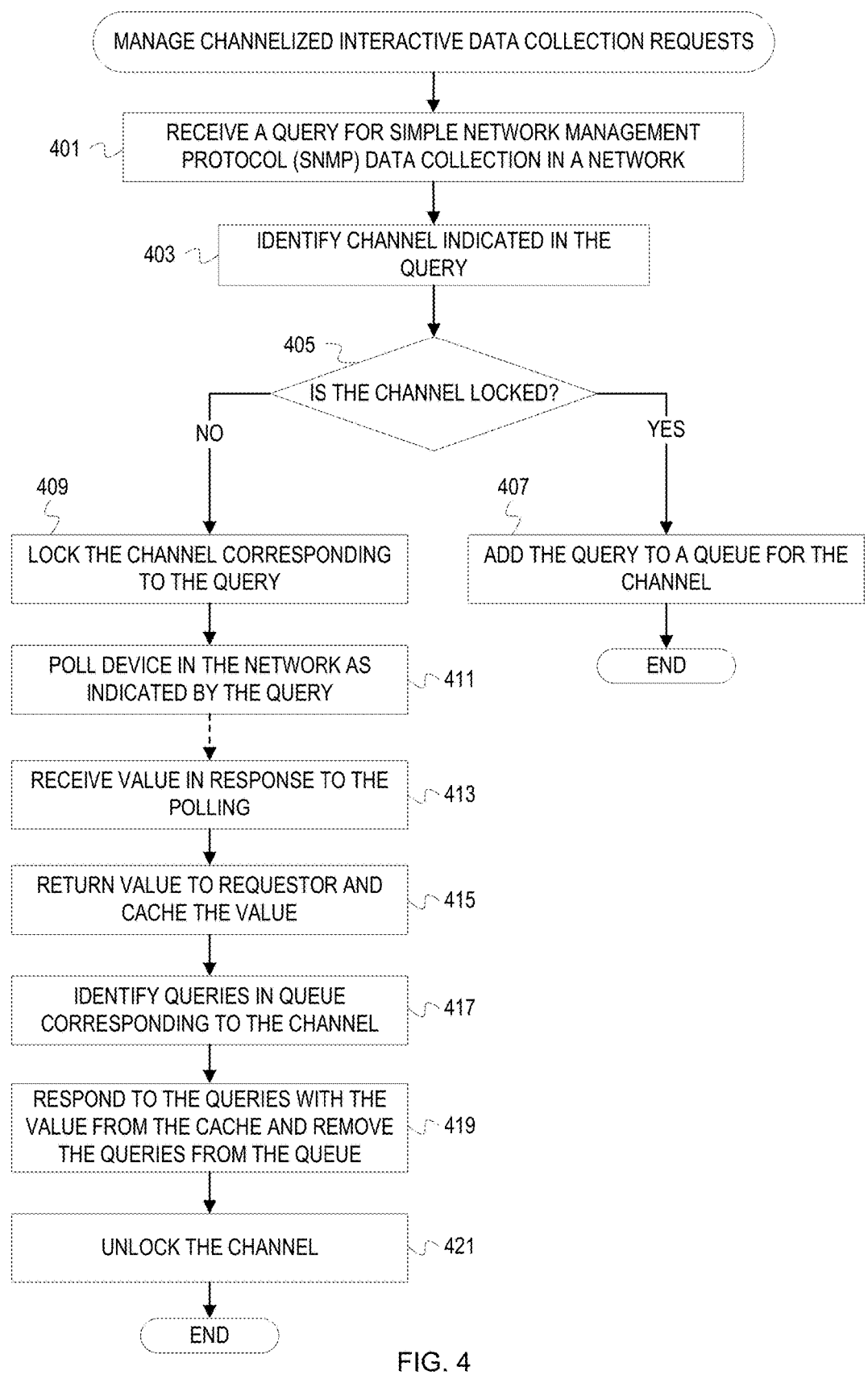
FIG. 4 depicts a flowchart with example operations for managing channelized interactive data collection requests with cache.

FIG. 4 depicts a flowchart with example operations for managing channelized interactive data collection requests with cache. The description of FIG. 4 refers to a poller as performing the example operations for consistency with FIG. 3.

A poller receives a query for SNMP data collection in a network (401). The query may be received from an evaluator which has invoked a defined implementation of an embedded query according to a query definition. The query may also be related to SNMP requests identified in a configuration file.

The poller identifies a channel indicated in the query (403). The channel is defined by a key-value pair of a device address and an OID. In some implementations, identification of a channel can include additional context parameters, or a channel can be defined by only a device address or only an OID. The poller parses the query or determines arguments indicated in the query to identify the device address and the OID. In some instances, the query may include more than one OID. In these instances, the poller identifies each of the channels as defined by the device address and the multiple OIDs.

The poller determines whether the channel is locked (405). The poller searches a list of locked channels which includes key-value pairs identifying the locked channels. The poller can search the list using the device address and determine whether any OIDs returned in the search match the OID in the query. If the identified channel is not indicated in the locked channel list, the poller determines that the channel is unlocked. If the identified channel is indicated in the locked channel list, the poller determines that the channel is locked.

If the channel is locked, the poller adds the query to a queue for the channel (407). Since the channel is locked, the received query for the channel cannot be submitted to the network and is blocked. The query is added to the queue for pending queries. The queue may be specific to the channel, or the poller may store the query in a queue along with an indication of the channel. The poller also associates the query in the queue with an identifier for a requesting device that submitted the query. The identifier may be an Internet Protocol address, a host name, etc. After adding the query to the queue, the processing of the query ends.

If the channel is not locked, the poller locks the channel corresponding to the channel (409). Because the channel is not locked, the poller can submit the query to the network. To ensure that duplicate queries are not also submitted, the poller locks the channel corresponding to the query. The poller locks the channel by adding the device address and OID as a key-value pair to a list of locked channels.

The poller polls a device in the network as indicated by the query (411). The poller polls a device associated with the device address according to the SNMP protocol. The poller receives an attribute value(s) to which the OID indicated in the query resolved (413). The poller may assign the value to an attribute variable or may perform other processing on the value as described in the query. As depicted by the dashed line in FIG. 4, the poller waits a period of time after polling the device until values are returned. During this time, other queries for the locked channel may be received and added to the queue.

After receiving a value in response to the polling, the poller returns the value to the requestor who submitted the query and caches the value (415). The poller responds to the query received at block 401 by supplying the value. The poller also caches the value in memory or other storage of a system executing the poller. The poller associates the cached value with the channel identifier of the device address and OID.

The poller identifies queries in the queue corresponding to the channel (417). The poller searches the queue using the channel identifier to determine whether the queue includes any queries which were blocked based on the channel being locked. The poller analyzes the entries in the queue to identify requestors which submitted the queries and any parameters associated with the queries. In some implementations, a query may include parameters that indicate a specific attribute value to be extracted from the polled value(s). For example, a query may instruct the poller to extract attributes corresponding to an identifier, such as an IP address for an interface on a network device. The poller searches the polled value(s) received at block 413 using the identifier to determine whether the query is satisfied by the polled values. If an attribute corresponding to the identifier is not included in the polled values, the poller determines that the query is not satisfied and dequeues the corresponding query for submission to the network.

The poller responds to the queries with the value from the cache and removes the queries from the queue (419). The poller supplies the cached value to each of the identified requestors. Prior to supplying the cached value, the poller may process the value according to any parameters indicated in an associated query. For example, the poller may extract an attribute value pertaining to a particular component from the cached value and supply the extracted attribute value. After responding to the queries, the poller removes the queries from the queue.

The poller unlocks the channel (421). The poller may unlock the channel after responding to each query which was placed in the queue, or the poller may unlock the channel a period of time after the value was added to the cache. For example, the poller may unlock the channel after a regular polling interval has elapsed. The poller unlocks the channel by deleting the key-value pair identifying the channel from a list of locked channels. The poller unlocks the channel so that a next query received for the channel will be submitted to the corresponding device to retrieve an updated value(s). After unlocking the channel, the process ends.

Variations

The example illustrations can be examined for concurrency optimization across metric expressions. Embodiments can determine dependencies across metric expressions to avoid blocking interactive data collection of independent attribute values in an environment with concurrent processing capabilities. In cases of a metric expression with multiple embedded queries, the implementations of the embedded queries can be invoked in parallel if the attribute variables being collected are independent. Across metric expressions, embodiments can determine dependencies of metric values as well as attribute variables. For instance, a metric expression may use a metric value from another metric expression, thus a metric value dependency exists.

Although the embedded queries allow for interactive data collection of dynamic attribute variables, the embedded queries also allow for efficient adaptation to changes in MIB sub-trees. For example, an administrator may wish to present average traffic (bytes in and out) on the least busy interfaces of monitored routers. To do this, the network management system collects traffic data for all interfaces for all of the monitored routers. Metric expressions then effectively sift through this data to determine the least busy interfaces of each router to finally compute the average amount of traffic on these least busy interfaces. New OIDs are then defined for the routers that resolve to an identifier of the least busy interface in different time windows. The SNMP data collection configuration file can be reduced to collecting the OID for the desired time window metric expressions with embedded queries for the traffic statistics for the interfaces that will be identified from the SNMP data collection. Not only has the collection configuration been reduced, but the amount of management traffic has been significantly reduced with the embedded queries.

The examples often refer to an "evaluator." The evaluator is a construct used to refer to implementation of functionality for hooking an embedded query in an expression language into a defined implementation of the query for interactive SNMP data collection. This construct is utilized since numerous implementations are possible. An evaluator can be given any moniker depending on platform, programming language, programmer preference, etc. In addition, the functionality attributed to an "evaluator" can be distributed across different components, whether software or hardware components. For instance, invoking implementation instances of embedded queries may be done with a software component while evaluation of a metric expression with collected data may be performed by arithmetic hardware components.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, an evaluator can move on to the example operation represented by block 217 and avoid 213 if the metric expression does not have a blocking dependency. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
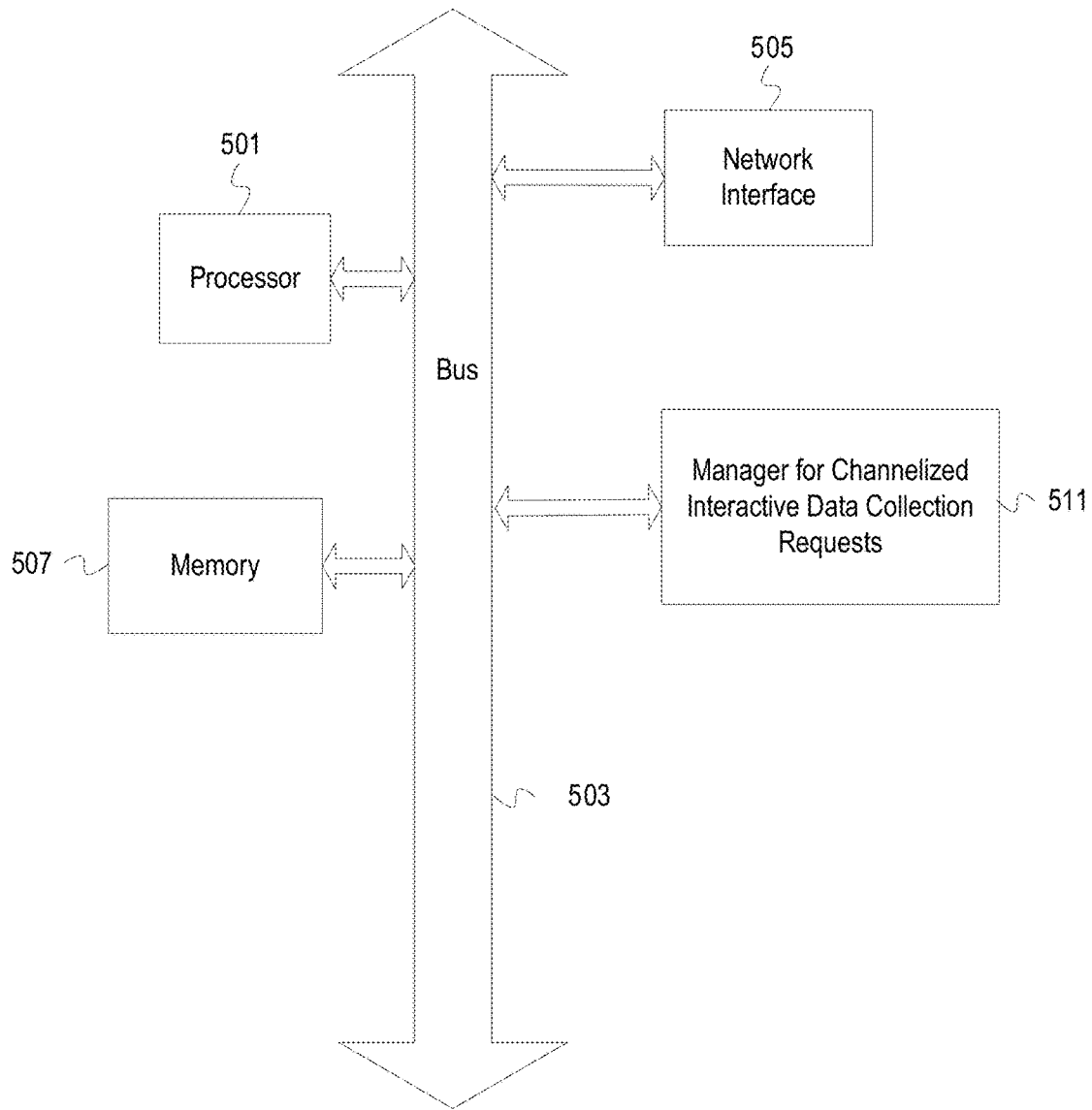
FIG. 5 depicts an example computer system with a metric expression evaluator for interactive network management data collection.

FIG. 5 depicts an example computer system with a manager for channelized interactive data collection requests. The computer system includes a processor 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system also includes a manager for channelized interactive data collection requests 511. The manager for channelized interactive data collection requests 511 queues duplicate data collection requests for locked channels in a network and responds to the requests once a value corresponding to the request has been received and cached. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for managing channelized query driven interactive SNMP data collection as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   after receipt of a first request for a simple network management protocol (SNMP) data collection,
      identifying a first data collection channel indicated in the first request, wherein the first data collection channel is indicated by a device address and an object identifier;
      locking the first data collection channel; and
      submitting the first request for SNMP data collection;
   after receipt of a second request for an SNMP data collection,
      determining that the second request indicates the first data collection channel; and
      based on determining that the first data collection channel is locked, blocking the second request; and adding the second request to a queue;
   upon receipt of a value in response to submitting the first request for SNMP data collection,
      supplying the value in response to the first request; and
      based on determining that the second request is in the queue, supplying the value in response to the second request.

2. The method of claim 1 further comprising:
   after receipt of a third request for an SNMP data collection,
      identifying a second data collection channel indicated in the third request; and
      based on determining that the second data collection channel is unlocked, submitting the third request for SNMP data collection.

3. The method of claim 1 further comprising, after supplying the value in response to the first request or the second request, unlocking the first data collection channel.

4. The method of claim 1, wherein locking the first data collection channel comprises indicating the device address and the object identifier in a list of locked channels.

5. The method of claim 1 further comprising, upon receipt of a value in response to the first request, storing the value in a cache.

6. The method of claim 5, wherein the value is supplied in response to the second request from the cache.

7. The method of claim 5 further comprising:
identifying an expiration time associated with the value stored in the cache;
responding to requests for the first data collection channel with the value from the cache until the expiration time; and
unlocking the first data collection channel after the expiration time.

8. The method of claim 7, wherein the expiration time corresponds to an SNMP polling interval for the first data collection channel.

9. The method of claim 1, wherein identifying a first data collection channel indicated in the first request comprises parsing the first request to identify the device address and the object identifier.

10. One or more non-transitory machine-readable media comprising program code for collection of network management data from networked devices, the program code to:
based on a request to collect network management data from a device in a network, record a combination of at least an address of the device and an object identifier indicated in the request;
while response to the request is pending, determine whether each subsequent request indicates a device address and an object identifier that match the recorded combination and enqueue each subsequent request determined as matching;
based on a response to the request that indicates a set of one or more values, determine which of the enqueued requests is satisfied with the set of one or more values;
supply the set of one or more values in response to those of the enqueued requests satisfied with the set of one or more values; and
dequeue one of the enqueued requests not satisfied by the set of one or more values.

11. The machine-readable media of claim 10 further comprising program code to:
store the set of one or more values in a cache, wherein the set of one or more values in the cache are associated with an expiration time corresponding to a polling interval for the device; and
based on a request received prior to the expiration time which indicates the recorded combination, supply a value in the set of one or more values from the cache.

12. An apparatus comprising:
a processor; and
a machine-readable medium having program code executable by the processor to cause the apparatus to,
after receipt of a first request for a simple network management protocol (SNMP) data collection,
identify a first data collection channel indicated in the first request, wherein the first data collection channel is indicated by a device address and an object identifier;
lock the first data collection channel; and
submit the first request for SNMP data collection;
after receipt of a second request for an SNMP data collection,
determine that the second request indicates the first data collection channel; and
based on a determination that the first data collection channel is locked,
block the second request; and
add the second request to a queue;
upon receipt of a value in response to submitting the first request for SNMP data collection,
supply the value in response to the first request; and
based on a determination that the second request is in the queue, supply the value in response to the second request.

13. The apparatus of claim 12 further comprising program code executable by the processor to cause the apparatus to:
after receipt of a third request for an SNMP data collection,
identify a second data collection channel indicated in the third request; and
based on a determination that the second data collection channel is unlocked, submit the third request for SNMP data collection.

14. The apparatus of claim 12 further comprising program code executable by the processor to cause the apparatus to, after supplying the value in response to the first request or the second request, unlock the first data collection channel.

15. The apparatus of claim 12, wherein the program code executable by the processor to cause the apparatus to lock the first data collection channel comprises program code executable by the processor to cause the apparatus to indicate the device address and the object identifier in a list of locked channels.

16. The apparatus of claim 12 further comprising program code executable by the processor to cause the apparatus to, upon receipt of a value in response to the first request, store the value in a cache.

17. The apparatus of claim 16, wherein the value is supplied in response to the second request from the cache.

18. The apparatus of claim 16 further comprising program code executable by the processor to cause the apparatus to:
identify an expiration time associated with the value stored in the cache;
respond to requests for the first data collection channel with the value from the cache until the expiration time; and
unlock the first data collection channel after the expiration time.

19. The apparatus of claim 18, wherein the expiration time corresponds to an SNMP polling interval for the first data collection channel.

20. The apparatus of claim 12, wherein the program code executable by the processor to cause the apparatus to identify a first data collection channel indicated in the first request comprises program code executable by the processor to cause the apparatus to parse the first request to identify the device address and the object identifier.

* * * * *